(12) United States Patent
Sultana et al.

(10) Patent No.: US 11,788,430 B2
(45) Date of Patent: Oct. 17, 2023

(54) COUNTER-ROTATING TURBINE OF AN AIRCRAFT TURBOMACHINE AND METHOD FOR THE NON-DESTRUCTIVE TESTING OF A COUNTER-ROTATING TURBINE ROTOR

(71) Applicant: SAFRAN AIRCRAFT ENGINES, Paris (FR)

(72) Inventors: Patrick Jean Laurent Sultana, Moissy-Cramayel (FR); Renaud James Martet, Moissy-Cramayel (FR); Maxime Aurelien Rotenberg, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 238 days.

(21) Appl. No.: 17/440,073

(22) PCT Filed: Mar. 16, 2020

(86) PCT No.: PCT/FR2020/050549
§ 371 (c)(1),
(2) Date: Sep. 16, 2021

(87) PCT Pub. No.: WO2020/193905
PCT Pub. Date: Oct. 1, 2020

(65) Prior Publication Data
US 2022/0186633 A1 Jun. 16, 2022

(30) Foreign Application Priority Data
Mar. 25, 2019 (FR) .................................. 1903092

(51) Int. Cl.
*F01D 21/00* (2006.01)
*F01D 1/26* (2006.01)
*F02K 3/072* (2006.01)

(52) U.S. Cl.
CPC ............. *F01D 21/003* (2013.01); *F01D 1/26* (2013.01); *F02K 3/072* (2013.01); *F05D 2260/83* (2013.01); *F05D 2270/8041* (2013.01)

(58) Field of Classification Search
CPC .......... F01D 21/003; F01D 1/26; F02K 3/072; F05D 2260/83; F05D 2270/8041; F05D 2260/80; F02C 3/067
(Continued)

(56) References Cited

U.S. PATENT DOCUMENTS 10,088,435 B2 * 10/2018 Lee ....................... G01M 15/14
2006/0088414 A1 4/2006 Harivel et al.
(Continued)

FOREIGN PATENT DOCUMENTS

EP 3182085 A1 6/2017
FR 2771515 A1 5/1999
(Continued)

OTHER PUBLICATIONS

International Search Report received for PCT Patent Application No. PCT/FR2020/050549, dated Jul. 21, 2020, 7 pages (2 pages of English Translation and 5 pages of Original Document).

*Primary Examiner* — Hoang M Nguyen
(74) *Attorney, Agent, or Firm* — WOMBLE BOND DICKINSON (US) LLP

(57) ABSTRACT

A counter-rotating turbine of an aircraft turbomachine, includes a casing including an endoscopy port configured for an endoscopy plug of a non-destructive testing device to pass into the casing. The endoscopy plug includes a mechanism for acquiring and transmitting images. The non-destructive testing device includes a mechanism for receiving and displaying images connected to the mechanism for acquiring and transmitting images by a wireless connection. First and second rotors are configured to rotate in opposite (Continued)

rotation directions, the second rotor having an endoscopy port in which the endoscopy plug is removably attached.

9 Claims, 3 Drawing Sheets

(58) Field of Classification Search
USPC .......................................................... 415/118
See application file for complete search history.

(56) References Cited

U.S. PATENT DOCUMENTS

| 2009/0027665 | A1* | 1/2009 | Ogburn .............. G02B 23/2492 356/241.4 |
| 2009/0079821 | A1* | 3/2009 | Bousquet ............ G01M 13/028 348/E7.085 |
| 2016/0178532 | A1* | 6/2016 | Lim ................... G01N 21/9515 348/46 |
| 2016/0194088 | A1* | 7/2016 | Leutard ................. F01D 21/003 415/118 |
| 2017/0219815 | A1 | 8/2017 | Letter et al. |
| 2019/0085725 | A1 | 3/2019 | Zatorski et al. |

FOREIGN PATENT DOCUMENTS

| FR | 2876444 A1 | 4/2006 |
| FR | 2975771 A1 | 11/2012 |
| FR | 3015750 A1 | 6/2015 |

\* cited by examiner

[Fig. 1a]
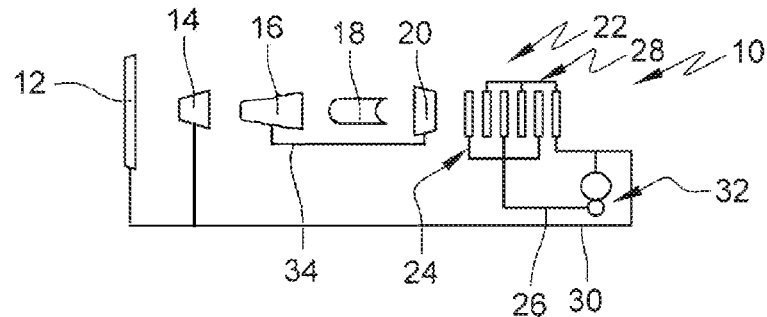
[Fig. 1b]
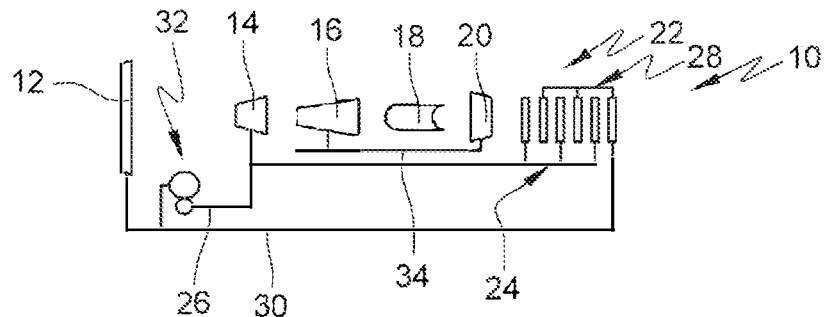
[Fig. 2]
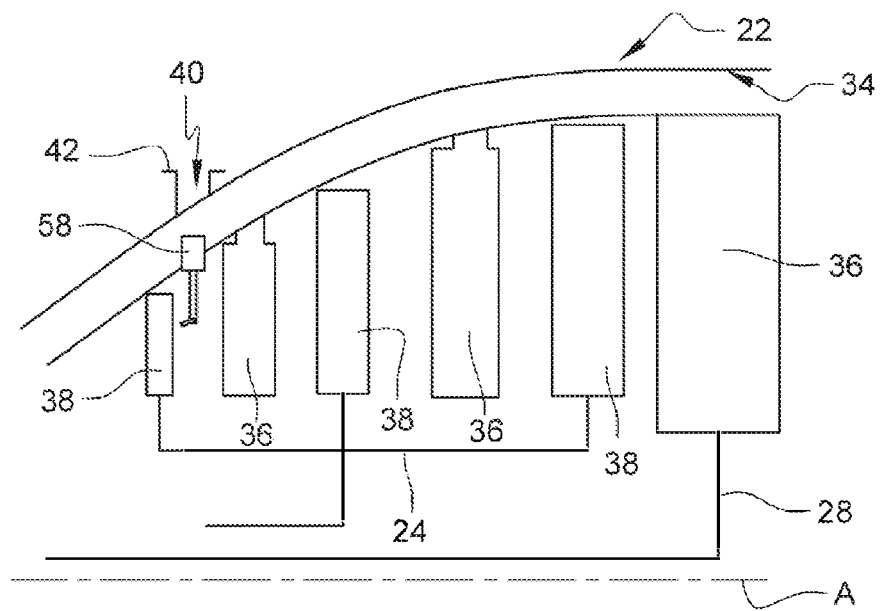

[Fig. 3]
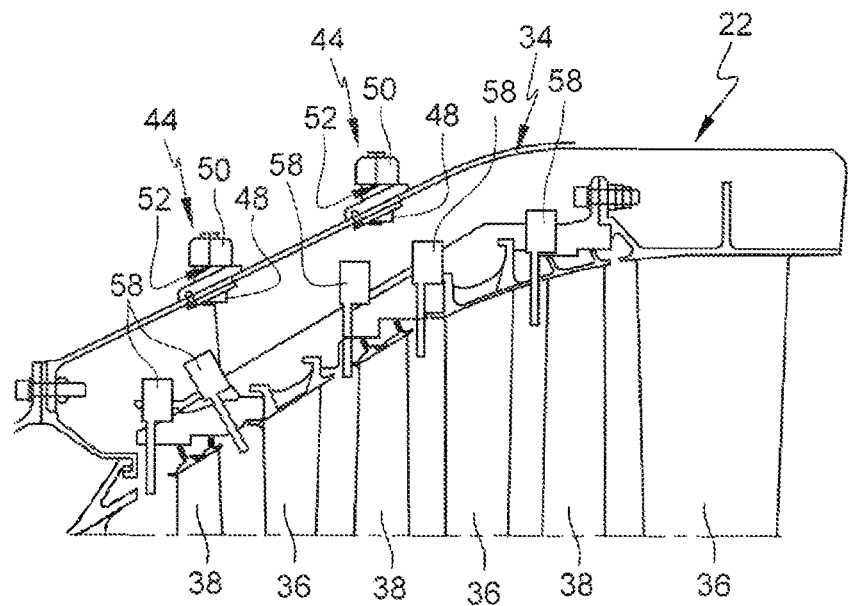
[Fig. 4]
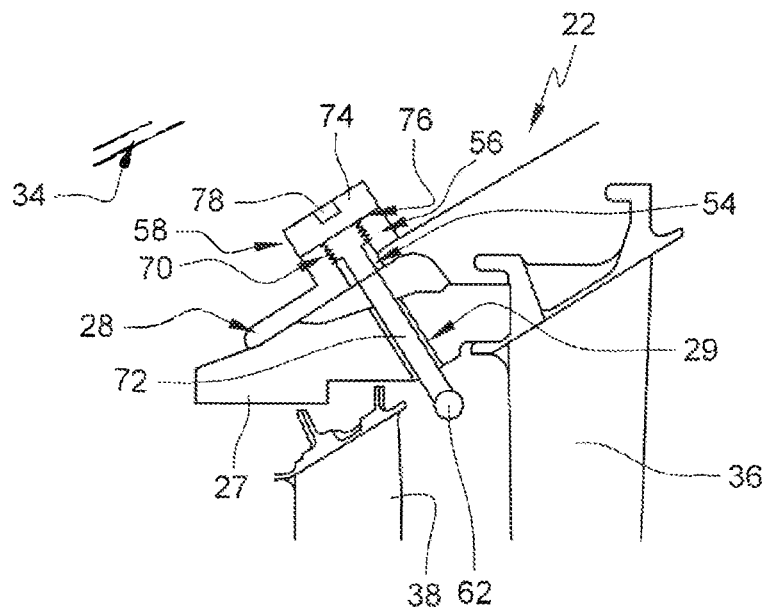

[Fig. 5]
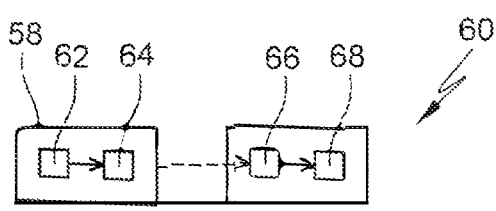

COUNTER-ROTATING TURBINE OF AN AIRCRAFT TURBOMACHINE AND METHOD FOR THE NON-DESTRUCTIVE TESTING OF A COUNTER-ROTATING TURBINE ROTOR

TECHNICAL FIELD OF THE INVENTION

The invention relates to the field of the aircraft turbomachines, and more specifically to a method for non-destructive testing of a rotor of a counter-rotating turbine of a turbomachine.

BACKGROUND

The prior art comprises in particular, but is not limited to, the patent applications EP-A1-3 182 085, US-A1-2017/219815, FR-A1-2 876 444 and FR-A1-3 015 750.

In a known way, an aircraft turbomachine comprises from upstream to downstream, in the flow direction of the gas, a fan, a low-pressure compressor, a high-pressure compressor, a combustion chamber, a high-pressure turbine and a low-pressure turbine. The low-pressure compressor rotor is driven by the rotor of the low-pressure turbine, and the rotor of the high-pressure compressor is driven by the rotor of the high-pressure turbine.

Within the scope of the maintenance of a turbomachine, it is necessary to carry out operations of non-destructive testing of the pieces of the turbomachine.

This non-destructive testing can be carried out by means of an endoscope, which is an elongated optical instrument, shaped like a tube, for example flexible, which houses optical means for transmitting images from one of its ends to means for displaying the images. Such an endoscope is generally introduced into the turbomachine through an endoscopy port, for example formed on a casing of the turbomachine. The endoscope is inserted at the level of a stator of the turbomachine, and the rotor is rotated in order to acquire 360° images of the rotor. Such an endoscope is wired to the means for displaying the images. The patent applications FR 2 771 515 A1 and FR 2 975 771 A1 describe endoscopy devices and methods using such endoscopes.

In some turbomachines, the low-pressure turbine can be a counter-rotating turbine. In this case, the low-pressure counter-rotating turbine comprises two counter-rotating rotors nested in each other. A first rotor is configured to rotate in a first direction of rotation and is connected to a first turbine shaft, and a second rotor is configured to rotate in a direction of rotation opposite the first direction of rotation and is connected to a second turbine shaft. The first rotor is connected to the first turbine shaft by an inner drum, and the second rotor is connected to the second turbine shaft by an outer drum. The first rotor comprises impellers interposed between the impellers of the second rotor. In particular, the second rotor is arranged radially around the first rotor, and a casing is arranged radially around the second rotor. There is usually no static part in the duct formed between the first and the second rotor.

A low-pressure counter-rotating turbine architecture allows to reduce the number of stages of the low-pressure turbine compared to the conventional low-pressure turbines. For the low-pressure counter-rotating turbine architectures, there is the problem of the endoscopy of the set of the bladings of the first and second rotors of the low-pressure counter-rotating turbine. Indeed, the conventional solution of inserting an endoscope through an endoscopy port into the stator of the low-pressure turbine and the rotation of a rotor of the low-pressure turbine is no longer possible. As the first and second rotors of the low-pressure counter-rotating turbine are linked by a gearbox called the PGB (Power Gear Box), it is not possible to make one rotor turn in one direction without making the other rotor turn in the opposite direction.

The purpose of the invention is to provide a solution allowing to remedy at least some of these drawbacks.

In particular, the present invention proposes a non-wired endoscopy device that allows to visualize elements of the turbomachine that are not accessible if the rotor or the rotors of the low-pressure counter-rotating turbine are rotatable.

SUMMARY OF THE INVENTION

To this end, the invention relates to a counter-rotating turbine of an aircraft turbomachine, comprising:
  a casing comprising at least one endoscopy port configured for an endoscopy plug of a non-destructive testing device to pass into said casing, said non-destructive testing device comprising said endoscopy plug adapted to be secured in an endoscopy port of a radially outer rotor of the counter-rotating turbine, said endoscopy plug comprising means for acquiring and transmitting images configured to acquire images of the rotor and to send said acquired images, and means for receiving and displaying images configured to receive and display said acquired images, said means for receiving and displaying images being connected to said means for acquiring and transmitting images by means of a wireless connection,
  a first rotor, referred to as radially inner rotor, connected to a first turbine shaft and configured to rotate in a first direction of rotation,
  a second rotor, referred to as radially outer rotor, connected to a second turbine shaft and configured to rotate in a direction of rotation opposite to the first direction of rotation,
said second rotor being arranged radially around said first rotor,
said casing being arranged radially around said second rotor,
and being characterized in that said radially outer rotor has an endoscopy port into which the endoscopy plug of the non-destructive testing device is releasably secured.

Advantageously, the non-destructive testing device according to the invention is a non-wired endoscopy device allowing to visualize pieces of the internal rotor of a counter-rotating turbine which are not accessible, even if this internal rotor is rotatable, which cannot be carried out with an endoscopy device according to the prior art. Indeed, the endoscopy devices according to the prior art are wired, and therefore do not allow the two rotors of the counter-rotating turbine to be rotated without tangling or breaking the optical wires.

The endoscopy plug may be adapted to be releasably secured in the endoscopy port of the radially outer rotor of the counter-rotating turbine. In particular, the endoscopy plug may have an external thread, and the endoscopy port of the radially outer rotor of the counter-rotating turbine may be at least in part a threaded port. In this case, the endoscopy plug is adapted to be screwed into the endoscopy port.

The connection between the means for receiving and displaying images and the means for acquiring and transmitting images can be carried out by Wi-Fi or Bluetooth.

The endoscopy plug may comprise a cavity adapted to receive a wrench to allow the endoscopy plug to be screwed and/or unscrewed.

The radially outer rotor of the counter-rotating turbine may have a boss which extends radially outwardly and around the endoscopy port. In this case, the endoscopy plug can be adapted to be fixed on this boss.

The endoscopy port of the casing can also be configured for the passage of the wrench that allows the endoscopy plug to be screwed and/or unscrewed.

The boss may have a thread arranged in continuation of the endoscopy port. In this case, the endoscopy plug can be screwed onto the boss.

The invention also relates to an aircraft turbomachine comprising a counter-rotating turbine according to the invention.

The counter-rotating turbine can be a low-pressure counter-rotating turbine.

The invention also relates to a method for non-destructive testing of a rotor of a counter-rotating turbine according to the invention by means of a non-destructive testing device, characterized in that said method comprises the steps of:
  placing the endoscopy plug into the endoscopy port of the radially outer rotor of the counter-rotating turbine,
  rotating the first and second rotors of the counter-rotating turbine and an image acquisition of the radially inner rotor of the counter-rotating turbine by means of the means for acquiring images,
  transmitting said acquired images to the means for receiving images by means of wireless communication.

The rotation of the first and second rotors of the counter-rotating turbine can be manual or assisted.

The method may comprise, prior to placing the endoscopy plug in the endoscopy port of the radially outer rotor of the counter-rotating turbine, the steps of:
  removing a plug from an endoscopy port of the casing of the counter-rotating turbine, and
  removing a plug from an endoscopy port of the radially outer rotor of the counter-rotating turbine, said plug being removed through the endoscopy port of the casing of the counter-rotating turbine,
and, upon placing the endoscopy plug in the endoscopy port of the radially outer rotor of the counter-rotating turbine, said endoscopy plug is inserted through the endoscopy port of the casing of the counter-rotating turbine.

The method may comprise, upon placing the endoscopy plug in the endoscopy port of the radially outer rotor of the counter-rotating turbine, a screwing of the endoscopy plug onto the boss.

BRIEF DESCRIPTION OF FIGURES

The invention will be better understood and other details, characteristics and advantages of the present invention will become clearer from the following description made by way of non-limiting example and with reference to the attached drawings, in which:

FIG. 1a is a very schematic semi-axial cross-sectional view of an embodiment of an aircraft turbomachine with low-pressure counter-rotating turbine, FIG. 1b is a very schematic semi-axial cross-sectional view of another embodiment of an aircraft turbomachine with low-pressure counter-rotating turbine, FIG. 2 is a very schematic semi-axial cross-sectional view of a counter-rotating turbine according to the invention, FIG. 3 is a cross-sectional view of a part of a counter-rotating turbine according to the invention, FIG. 4 is a cross-sectional view of a part of a counter-rotating turbine according to the invention, and FIG. 5 represents very schematically a non-destructive testing device according to the invention.

The elements having the same functions in the different embodiments have the same references in the figures.

DETAILED DESCRIPTION OF THE INVENTION

FIGS. 1a and 1b show an aircraft turbomachine comprising a low-pressure counter-rotating turbine. The turbomachine may be a turboprop or a turbojet engine.

The turbomachine 10 comprises from upstream to downstream, in the direction of gas flow, a fan 12, a low-pressure compressor 14, a high-pressure compressor 16, a combustion chamber 18, a high-pressure turbine 20 and a low-pressure counter-rotating turbine 22.

The low-pressure counter-rotating turbine 22 comprises a first rotor 24 that is connected to a first turbine shaft 26 and is configured to rotate in a first direction of rotation. The low-pressure counter-rotating turbine 22 also comprises a second rotor 28 which is connected to a second turbine shaft 30 and is configured to rotate in a direction opposite to the first direction of rotation. The first and second rotors 24, 28 are linked by a reduction gearbox 32, which is arranged between the low-pressure counter-rotating turbine 22 and the fan 12.

The rotor of the high-pressure compressor 16 is driven by the rotor of the high-pressure turbine 20. The rotor of the low-pressure compressor 14 is driven by one of the rotors of the low-pressure counter-rotating turbine 22. In FIG. 1a, the second rotor 28 is connected to the low-pressure compressor 14 and the fan 12. In FIG. 1b, the first rotor 24 is connected to the low-pressure compressor 14 and the second rotor 28 is connected to the fan 12.

The low-pressure counter-rotating turbine 22 thus comprises a so-called slow rotor and a so-called fast rotor, the slow rotor being configured to drive the fan 12 and the fast rotor being configured to drive the low-pressure compressor 14 and being able to mesh with the reduction gearbox, which may comprise a mechanical gearbox, for example with an epicyclic train.

In FIG. 1b, the reduction gearbox connects the fast rotor and the slow rotor, allowing a power transfer from the fast rotor to the slow rotor. It is therefore possible to take advantages of a fast low-pressure compressor 14, while providing energy to the fan 12.

FIG. 2 shows a low-pressure counter-rotating turbine 22, which also comprise a casing 34 arranged radially around the second rotor 28 with respect to the axis of the turbomachine, noted A in FIG. 2.

The second rotor 28, called the radially outer rotor, is arranged radially around the first rotor 24, called radially inner rotor, with respect to the axis A of the turbomachine.

Each rotor 24, 28 comprises impellers 36, 38. The impellers 36 of the radially outer rotor 28 are interposed between the impellers 38 of the radially inner rotor 24.

The casing 34 of the low-pressure counter-rotating turbine 22 may comprise one or a plurality of endoscopy ports 40 configured for the passage of a device for non-destructive testing a piece arranged within the casing, for example an endoscope. The number of endoscopy ports 40 in the casing 34 depends on the number of areas within the casing 34 for which an endoscopy is desired. For example, there may be between one and ten endoscopy ports 40 for the turbine or between one and two endoscopy ports 40 per turbine stage. An endoscopy port 40 may be cylindrical in shape with a circular, oval, polygonal or any other base. In FIG. 2, only one endoscopy port 40 has been shown, but the casing 34 may comprise a plurality of endoscopy ports 40.

An endoscopy port 40 may be formed in a boss 42, which is attached to the casing 34, and which has an internal port that communicates with the endoscopy port 40 of the casing 34. A boss 42 is a member which is fitted and secured to the casing 34 at the level of each endoscopy port 40 so as to define a protruding boss on the outer surface of the casing 34. In general, there are as many bosses 42 as there are endoscopy ports 40.

The internal port of the boss 42 may be a threaded port. In other words, the internal port may have an internal thread. The internal port may be cylindrical in shape with a circular, oval, polygonal or other base. The internal port may be aligned with the endoscopy port 40. More specifically, the internal port and the endoscopy port 40 may be coaxial.

A boss 42 may be welded to the casing 34.

More specifically, FIG. 3 shows a part of the low-pressure counter-rotating turbine 22. In order to seal the casing 34, the bosses 42 of the casing 34 are provided with plugs 44 arranged so as to close the endoscopy ports 40. Each endoscopy port 40 is associated with a plug 44. In other words, each endoscopy port 40 is adapted to receive a plug 44. The plug 44 may be in a mounted position, in which the plug 44 is carried on the casing 34 and closes the endoscopy port 40, or in a disassembled position, in which the plug 44 is removed from the casing 34 and the endoscopy port is cleared so as to allow passage of an endoscope.

A plug 44 is removable in a boss 42.

A plug 44 may comprise an externally threaded stem 48 which is adapted to cooperate with the internal threaded hole of the boss 42 with which the endoscopy port 40 of the casing 34 communicates. A plug 44 may comprise a head 50 having a diameter greater than the diameter of the stem 48. The stem 48 and the head 50 of the plug 44 may be cylindrical in shape, with a circular, oval, polygonal or any other base.

The diameter of the head 50 is greater than the diameter of the endoscopy port 40 and the internal port of the boss 42, so that when the plug 44 is inserted into the endoscopy port 40, the head 50 remains outside the casing 34 and the stem 48 is within the endoscopy port 40, i.e., inside the casing 34.

The plug 44 may have anti-loosening means, so as to hold the plug 44 to the casing 34.

The boss 42 is radially bounded by an inner surface and an outer surface (not shown). The inner surface of the boss 42 is welded to the casing 34, and the outer surface of the boss 42 is in contact with the plug of the casing 34. At the junction between the head 50 and the stem 48 of the plug 44, the plug 44 comprises a surface 52 which abuts the outer surface of the boss 42 when the plug 44 is in the mounted position.

A plug 44, and more specifically the head 50 of the plug 44, may comprise a cavity (not shown) adapted to receive a wrench to allow the plug 44 to be screwed and/or unscrewed from the boss 42.

The radially outer rotor 28 of the low-pressure counter-rotating turbine 22 may comprise one or a plurality of endoscopy ports (not visible in FIGS. 2 and 3, reference 54 in FIG. 4) configured for the passage of an endoscope. The number of endoscopy ports 54 in the radially outer rotor 28 is dependent on the number of areas within the radially outer rotor 28, and thus the number of areas of the radially inner rotor 24, for which an endoscopy is desired. Each endoscopy port 54 opens into the radially outer rotor between two vanes 36, 38. An endoscopy port 54 may be cylindrical in shape with a circular, oval, polygonal or any other base.

An endoscopy port 40 may be formed in a boss 56, which is secured to the radially outer rotor 28, and which has an internal port that communicates with the endoscopy port 54 of the radially outer rotor 28. The bosses 56 are arranged so that there is one boss 56 per row of vanes 36, 38. There are as many bosses 56 as there are endoscopy ports 54.

The internal port of the boss 56 may be a threaded port with a cylindrical shape with circular, oval, polygonal or any other base. The internal port and the endoscopy port 54 may be aligned, more specifically coaxial.

A boss 56 may be welded to the radially outer rotor 28.

The radially outer rotor 28 comprises a drum which extends around a sealing ring (not referenced in FIG. 3, reference 27 in FIG. 4). The sealing ring 27 is secured to the drum of the radially outer rotor 28. The ring 27 comprises a port (not referenced in FIG. 3, reference 29 in FIG. 4) which is coaxial with the endoscopy port 54. The ring 27 comprises a metallic outer part and an inner part of abradable material. These two inner and outer parts of the ring 27 are pierced by the port 29.

In order to seal the radially outer rotor 28, the bosses 56 of the radially outer rotor 28 are provided with plugs (not shown) arranged so as to seal the endoscopy ports 54. Each endoscopy port 54 is associated with a plug, which is removable in a boss 56.

The plug of the radially outer rotor 28 may comprise an externally threaded stem, which is adapted to cooperate with the internal threaded port of the boss 56 with which the endoscopy port 54 of the radially outer rotor 28 communicates. In the position of the plug in the endoscopy port 54, the stem of the plug also obstructs the port 29 of the sealing ring 27. The plug may comprise a head with a diameter greater than the diameter of the stem. The stem and the head of the plug of the radially outer rotor 28 may be cylindrical, with circular, oval, polygonal or any other base.

The diameter of the head of the plug of the radially outer rotor 28 is greater than the diameter of the endoscopy port 54 and the inner port of the boss 56, so that when the plug is inserted into the endoscopy port 54, the head remains outside the radially outer rotor 28 and the stem is in the endoscopy port 54, i.e., inside the radially outer rotor 28. The plug of the radially outer rotor 28 may have anti-loosening means, so that it is held on the radially outer rotor 28.

The boss 56 is radially bounded by an inner surface and an outer surface (not shown). The inner surface of the boss 56 is welded to the radially outer rotor 28, and the outer surface of the boss 56 is in contact with the plug of the radially outer rotor 28. At the junction between the head and the stem of the plug of the radially outer rotor 28, the plug comprises a surface that abuts the outer surface of the boss 56 when the plug is in the mounted position.

A plug of the radially outer rotor 28, specifically the head of the plug, may comprise a cavity (not shown) adapted to receive a wrench to allow the plug to be screwed and/or unscrewed from the boss 56.

Specifically, FIG. 4 shows a part of the low-pressure counter-rotating turbine 22 during an endoscopy.

In order to carry out an endoscopy of the radially inner rotor 24 of the low-pressure counter-rotating turbine 22, a non-destructive testing device may be used.

FIG. 5 shows a non-destructive testing device 60.

The non-destructive testing device 60 comprises an endoscopy plug 58 adapted to be secured in an endoscopy port 54 of the radially outer rotor 28 of the low-pressure counter-rotating turbine 22. Specifically, the endoscopy plug 58 may be releasably secured in the endoscopy port 54 of the radially outer rotor 28.

The endoscopy plug 58 comprises means for acquiring images 62 configured to acquire images of the radially inner rotor 24, and means for transmitting images 64 configured to send said acquired images. The means for acquiring images 62 may be a camera. The means for acquiring images 62 are secured to the endoscopy plug 58. The means for acquiring images 62 and the means for transmitting images 64 may communicate with each other by means of a wired connection. Of course, these means can communicate by means of a wireless connection.

The non-destructive testing device 60 also comprises means for receiving images 66 configured to receive the images acquired by the means for acquiring images 62 and transmitted by the means for transmitting images 64, and means for displaying images 68 configured to display said images received by the means for receiving images 66. The means for receiving images 66 and the means for displaying images 68 may communicate with each other by means of a wired connection. Of course, these means can communicate by means of a wireless connection.

Optionally, the non-destructive testing device 60 may comprise storage means, preferably removable, configured to store the images acquired by the means for acquiring images 62.

The means for receiving and displaying images 66, 68 are connected to the means for acquiring and transmitting images 62, 64 by means of a wireless connection. More specifically, the means for receiving images 66 are connected to the means for transmitting images 64 by means of a wireless connection.

The wireless connection can be carried out by any type of wireless connection, and for example by radio waves such as Wi-Fi or Bluetooth.

As shown in FIG. 4, the endoscopy plug 58 is adapted to be releasably secured in the endoscopy port 54 of the drum of the radially outer rotor 28. The endoscopy plug 58 is arranged so as to close the endoscopy port 54.

The endoscopy plug 58 is removable from the boss 56.

The endoscopy plug 58 may comprise an externally threaded stem 72, which is adapted to cooperate with the internal threaded port in the boss 56 with which the endoscopy port 54 of the radially outer rotor 28 communicates. The stem 72 of the endoscopy plug 58 also pass through the port 29 of the sealing ring 27. Thus, the endoscopy plug 58 may have an external thread 70. The endoscopy plug 58 may comprise a head 74 having a diameter greater than the diameter of the stem 72. The stem 72 and the head 74 of the endoscopy plug 58 may be cylindrical in shape, with circular, oval, polygonal or any other base. The diameters of the endoscopy port 54 and the port 29 of the ring 27 may be greater than the diameter of the stem 72 of the endoscopy plug 58.

In particular, the means for acquiring images 62 are arranged at the end of the stem 72 of the endoscopy plug 58 opposite the end connected to the head 74.

The diameter of the head 74 is greater than the diameter of the endoscopy port 54 and the internal port of the boss 56, such that when the endoscopy plug 58 is inserted into the endoscopy port 54, the head 74 remains outside the radially outer rotor 28 and the stem 72 is within the endoscopy port 54, i.e., inside the radially outer rotor 28. Thus, the endoscopy plug 58 is secured and the means for acquiring images 62 can acquire images of the interior of the radially outer rotor 28, i.e. the radially inner rotor 24.

The endoscopy plug 58 is adapted to be screwed into the endoscopy port 54, and more specifically onto the boss 56.

At the junction between the head 74 and the stem 72 of the endoscopy plug 58, the endoscopy plug 58 comprises a surface 76 that abuts the outer surface of the boss 56 when the endoscopy plug 58 is in the mounted position. The outer surface of the boss 56 is thus in contact with the endoscopy plug 58.

The endoscopy plug 58, and more specifically the head 76 of the endoscopy plug 58, may comprise a cavity 78 adapted to receive a wrench to allow the endoscopy plug 58 to be screwed and/or unscrewed from the boss 56.

The invention also relates to a method for non-destructive testing of a rotor of a counter-rotating turbine by means of a non-destructive testing device as previously described.

The method may comprise a step of removing a plug 44 from an endoscopy port 40 of the casing 34. In particular, the plug 44 may be unscrewed from the boss 42 of the casing 34 to be removed from the endoscopy port 40.

Next, the method may comprise a step of removing the plug from an endoscopy port 54 of the radially outer rotor 28. In particular, the plug may be unscrewed from the boss 56 of the radially outer rotor 28 to be removed from the endoscopy port 54. This plug is then removed through the endoscopy port 40 of the casing 34.

The method then comprises a step of placing the endoscopy plug 58 into the endoscopy port 54 of the radially outer rotor 28. The endoscopy plug 58 is inserted through the endoscopy port 40 of the casing 34. The endoscopy plug 58 may be screwed onto the boss 56. The endoscopy plug 58 is inserted by means of a tool. The cavity 78 of the endoscopy plug 58 allows to hold the endoscopy plug 58 to the tool.

During operation of the low-pressure turbine, a so-called conventional plug, i.e. a plug that does not allow an endoscopy, is arranged in the endoscopy port 54 of the radially outer rotor 28. This plug is replaced by the endoscopy plug 58 for the endoscopy method according to the invention.

Thereafter, the method comprises a step of rotating the first and second rotors 24, 28 of the low-pressure counter-rotating turbine, and an acquisition of images of the radially inner rotor 24 by means of means for acquiring images 62. The rotation of the first and second rotors 24, 28 can be manual or assisted. In particular, the radially inner rotor 24 rotates in a first direction of rotation and the second rotor rotates in the opposite direction to the first direction of rotation.

The method then comprises a step of transmitting the acquired images from the rotor to the means for receiving images 66, by means of a wireless communication. The images acquired by the means for acquiring images 62 are transferred to the means for transmitting images 64, which sends the images to the means for receiving images 66, which transfers them to the means for displaying images 68 where they are visualized.

Once the endoscopy is complete, the method may then comprise a step of removing the endoscopy plug 58 from the endoscopy port 54. In particular, the endoscopy plug 58 may be unscrewed from the boss 56 with a tool to be removed from the endoscopy port 54. The endoscopy plug 58 is then removed through the endoscopy port 40 of the casing 34.

Next, the method may comprise a step of placing the plug of the endoscopy port 54 of the radially outer rotor 28. The plug is inserted through the endoscopy port 40 of the casing 34. In particular, the plug may be screwed onto the boss 56 with a tool.

The method may then comprise a step of placing the plug 44 of the endoscopy port 40 of the casing 34. In particular, the plug 44 may be screwed onto the boss 42 with a tool.

The endoscopy plug 58 may be positioned at each axial position of the radially outer rotor 28 required, i.e., in each endoscopy port 54 of the radially outer rotor 28. Thus, the steps of the method may be repeated for each endoscopy port 54 of the radially outer rotor 28.

In this description, the counter-rotating turbine has been described as the low-pressure turbine. Of course, the counter-rotating turbine according to the invention can be a high-pressure turbine.

The invention claimed is:

1. A counter-rotating turbine of an aircraft turbomachine, comprising:
   a casing comprising at least one endoscopy port configured for an endoscopy plug of a non-destructive testing device to pass into said casing, said non-destructive testing device comprising said endoscopy plug adapted to be secured in a endoscopy port of a radially outer rotor of the counter-rotating turbine, said endoscopy plug comprising means for acquiring and transmitting images configured to acquire images of the rotor and to send said acquired images, and means for receiving and displaying images configured to receive and display said acquired images, said means for receiving and displaying images being connected to said means for acquiring and transmitting images by means of a wireless connection,
   a first rotor, referred to as radially inner rotor, connected to a first turbine shaft and configured to rotate in a first direction of rotation,
   a second rotor, referred to as radially outer rotor, connected to a second turbine shaft and configured to rotate in a direction of rotation opposite to the first direction of rotation,
   said second rotor being arranged radially around said first rotor,
   said casing being arranged radially around said second rotor,
   and wherein said radially outer rotor has an endoscopy port into which the endoscopy plug of the non-destructive testing device is releasably secured.

2. The counter-rotating turbine according to claim 1, wherein the radially outer rotor comprises a boss extending radially outwardly and around the endoscopy port, said boss having a thread arranged in continuation of the endoscopy port, the endoscopy plug having an external thread, and said endoscopy plug (58) is screwed onto said boss.

3. The counter-rotating turbine according to claim 1, wherein the endoscopy plug has an external thread, the endoscopy port of the radially outer rotor of the counter-rotating turbine being at least in part an internally threaded port, said endoscopy plug being adapted to be screwed into said endoscopy port.

4. The counter-rotating turbine according to claim 1, wherein the connection between the means for receiving and displaying images and the means for acquiring and transmitting images is made by radio waves.

5. The counter-rotating turbine according to claim 1, wherein the endoscopy plug comprises a cavity adapted to receive a wrench to allow said endoscopy plug to be screwed and/or unscrewed.

6. A method for non-destructive testing of a rotor of a counter-rotating turbine according to claim 1 by means of a non-destructive testing device, wherein said method comprises the steps of:
   placing the endoscopy plug in the endoscopy port of the radially outer rotor of the counter-rotating turbine,
   rotating the first and second rotors of the counter-rotating turbine and an image acquisition within the radially outer rotor of the counter-rotating turbine, by means of the means for acquiring images,
   transmitting said acquired images to the means for receiving images by means of a wireless communication.

7. The method according to claim 6, wherein the rotation of the first and second rotors of the counter-rotating turbine is manual or assisted.

8. The method according to claim 6, comprising, prior to placing the endoscopy plug in the endoscopy port of the radially outer rotor of the counter-rotating turbine, the steps of:
   removing a plug from an endoscopy port of the casing of the counter-rotating turbine, and
   removing a plug from an endoscopy port of the radially outer rotor of the counter-rotating turbine, said plug being removed through the endoscopy port of the casing of the counter-rotating turbine,
   and, upon placing the endoscopy plug in the endoscopy port of the radially outer rotor of the counter-rotating turbine, said endoscopy plug is inserted through the endoscopy port of the casing of the counter-rotating turbine.

9. The method according to claim 6, wherein the radially outer rotor of the counter-rotating turbine comprises a boss which extends radially outwardly and around the endoscopy port, said boss having a thread arranged in continuation of the endoscopy port, the endoscopy plug having an external thread, the method comprising, upon placing the endoscopy plug in the endoscopy port of the radially outer rotor of the counter-rotating turbine, screwing the endoscopy plug onto said boss.

* * * * *